United States Patent

[11] 3,607,599

| | | |
|---|---|---|
| [72] | Inventor | George Bruce McPherson<br>Roper Mountain Road, Greenville, S.C. 29607 |
| [21] | Appl. No. | 683,265 |
| [22] | Filed | Nov. 15, 1967 |
| [45] | Patented | Sept. 21, 1971 |

[54] REINFORCED NONWOVEN LAMINATED FABRIC
2 Claims, 4 Drawing Figs.

[52] U.S. Cl. .................................................. 161/144,
156/178, 156/179
[51] Int. Cl. ...................................................... B32b 3/16,
D04h 5/08
[50] Field of Search ........................................... 161/65, 66,
67, 78, 89, 93, 142, 143, 144, 62–64; 156/166,
178, 179

[56] References Cited
UNITED STATES PATENTS

| 2,456,922 | 12/1948 | Cogovan ..................... | 161/143 X |
| 2,787,571 | 4/1957 | Miller .......................... | 161/143 X |
| 3,150,023 | 9/1964 | Penman ....................... | 156/73 |
| 3,238,595 | 3/1966 | Schwartz et al ............. | 28/74 |
| 3,322,607 | 5/1967 | Jung ............................ | 161/67 |
| 3,390,035 | 6/1968 | Sands .......................... | 156/72 |
| 3,414,458 | 12/1968 | Lacy ............................ | 161/67 |

FOREIGN PATENTS

| 855,299 | 11/1960 | Great Britain ................ | 161/85 |

Primary Examiner—Robert F. Burnett
Assistant Examiner—Roger L. May
Attorney—Bailey & Dority ABSTRACT: A nonwoven laminated fabric, such as a carpet, comprising a series of parallel warp strands coated with a latex binder and having a backing comprising randomly oriented scrim yarn and plastic sealing members. A modified form of the nonwoven laminated fabric or rug includes a series of parallel warp yarns having a backing which includes a first plastic sheet, a layer of randomly oriented scrim yarn, and a second plastic sheet providing a sealed backing. The layers of said laminated rug are secured together by a suitable bonding agent. Also, enclosed is the method of manufacturing such nonwoven laminated fabrics.

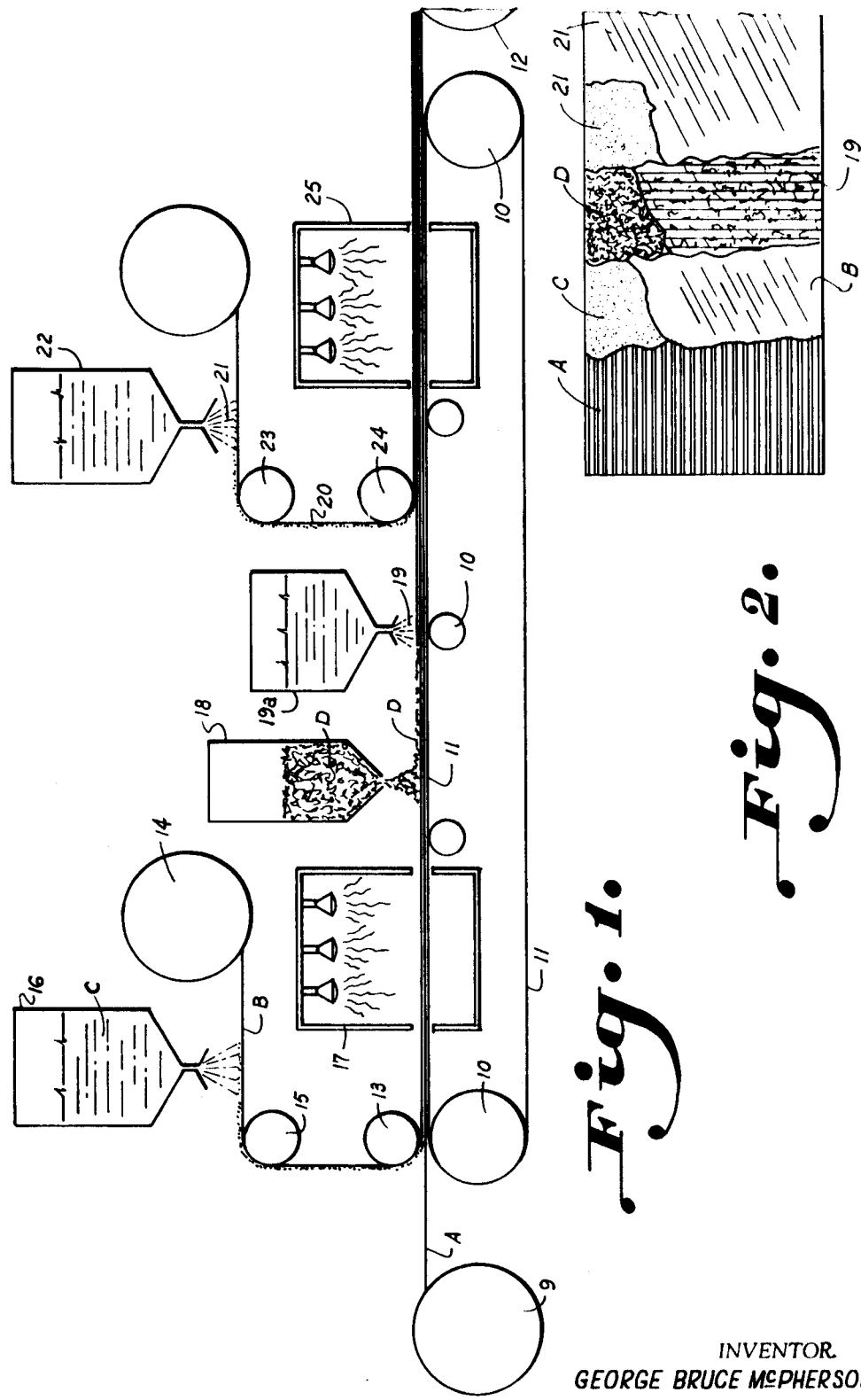

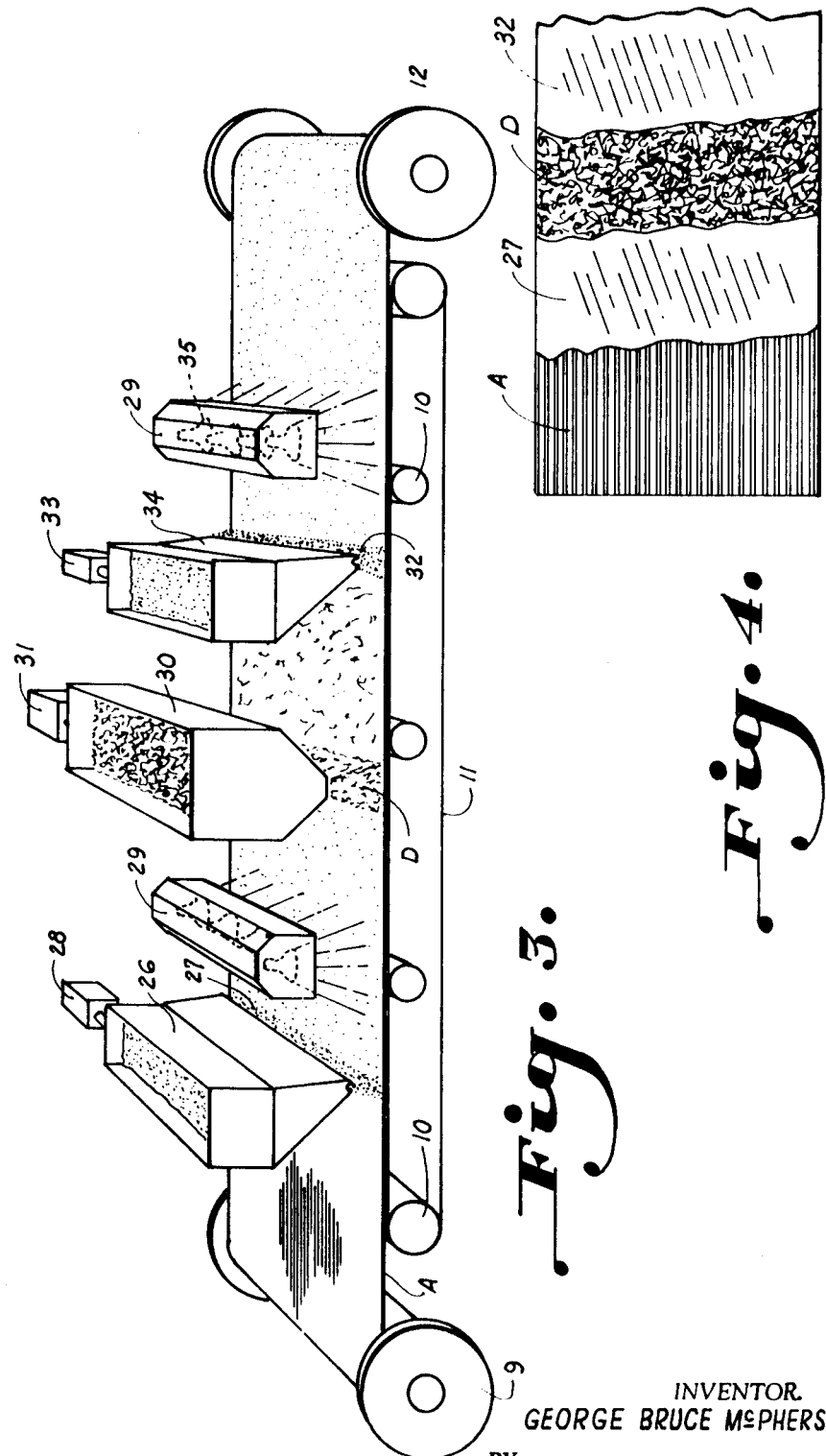

REINFORCED NONWOVEN LAMINATED FABRIC

This invention relates to laminated fabrics, such as carpets, having a plastic backing and the method of constructing said carpets.

The majority of the fabrics, such as rugs and carpets and the like, are manufactured by threading pile yarns through a readymade woven backing to form the pile loops. Backings formerly employed in tufted fabrics are made of woven material, such as cotton duck or woven jute fibers. There are several methods of forming the pile loops, such as by a needle punching process, napping the fibers, or sewing the loops in a woven backing material. However, such methods are relatively slow and expensive since a woven backing material has to first be produced prior to tufting or napping the fibers to make the loops of the carpet.

Attempts have been made to produce nonwoven fabrics, however, such generally are much weaker fabrics than those utilizing woven backings and the like. like. One method of producing a nonwoven pile fabric is illustrated in U.S. Pat. No. 3,102,611 granted to J. T. Mills on July 28, 1964. Plastic sheets have also been used as a backing for carpets, and an example of such is illustrated in U.S. Pat. No. 3,219,507 granted to H. W. Penman on Nov. 23, 1965. Such a method incorporates placing an extruded plastic sheet on the back of a woven pile fabric. A plurality of parallel warp strands or a scrim is adhered to the opposite side of the plastic sheet for adding body to the backing of the carpet. It is noted, however, that the pile fabric is of a conventional construction. Thus, instead of speeding up the process of making such carpets, it appears that more time would be necessary since the carpet for the fabric first has to be constructed in the slow and conventional manner, and then a backing adhered thereto. The Schwartz et al. U.S. Pat. No. 3,238,595 granted on Mar. 8, 1967, still another method of producing carpets. However, it is noted that a woven backing material is used in conjunction with resinous coatings.

Accordingly, it is an important object of the present invention to provide a carpet which can be constructed or manufactured at a high rate of speed compared to the above-mentioned conventional methods.

Another important object of the present invention is to provide a relatively inexpensive carpet having substantial strength and wearability which can be constructed in a short period of time.

Another important object of the present invention is to provide a nonwoven fabric which eliminates the use of woven material therein, thus minimizing the cost of such fabric.

Still another important object of the present binvention is to provide a new method of constructing nonwoven fabrics, such as carpet and the like, at a high rate of speed relative to conventional methods of constructing rugs and carpets.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a diagrammatic longitudinal sectional view of an apparatus for performing the method of the present invention to produce a nonwoven fabric in accordance with the present invention, FIG. 2 is a plan view, with parts broken away, illustrating a nonwoven fabric constructed in accordance with the present invention, FIG. 3 is a diagrammatic perspective view illustrating an apparatus for constructing a nonwoven fabric in accordance with another form of the invention, and FIG. 4 is a plan view, with parts broken away, illustrating the carpet constructed in accordance with the modified form of the invention.

The drawings illustrate a nonwoven fabric being constructed from a series of parallel warp strands A which provide an upper wearing surface for the fabric. A plastic sheet B covers a lower surface of the parallel warp strands, and an adhesive means C is interposed between the parallel warp strands A and the plastic sheet B for adhering the plastic sheet B to the warp strands A. A layer of scrim D of random alignment is carried on the opposite side of the plastic sheet B from the warp strands for adding strength to the fabric. In order to secure the scrim D to the plastic sheet B a bonding agent is sprayed thereon so that upon curing a substantially strong nonwoven fabric is produced.

In FIG. 3 instead of applying a plastic sheet, a latex binder, such as polyethylene, is deposited on the warp strands A and cured by heating. A layer of scrim D of random alignment is interposed between a pair of layers of such cured binder for producing a backing for the fabric.

Referring in more detail to FIG. 1, the series of parallel warp strands A are fed from a warp beam 9 over a conveyor which includes driven rollers 10 and the endless belt 11, and is taken up on a power-driven takeup roll 12. The movement of the takeup roll 12 and the conveyor belt 11 is synchronized by any suitable conventional means. In some instances the conveyor is not necessary since the warp strands A are of sufficient strength to support the backing material being deposited thereon without substantial sagging.

The parallel warp strands A may be of any suitable yarn, such as cotton, wool, synthetic yarns, or a blend of such. The parallel strands of yarn A are positioned in close relation to each other so that when the backing material is adhered thereto, such produces a carpet having an upper surface similar to corduroy. In other words, the warp strands provide ridges or ribs on the backing material.

As the warp strands A pass under an upper roller 13 a sheet of plastic B is adhered thereto by adhesive C sprayed on the back of the plastic sheet B. The plastic sheet B may be of any suitable material, and in one preferred embodiment, such is polyethylene. It is fed from a roll 14 over an idler roller 15 and pressed in contact with the warp strands A as such passes between the upper roller 13 and the conveyor belt 11. The adhesive C is sprayed on one side of the polyethylene sheet B as such passes under the reservoir 16. Any suitable adhesive can be utilized which will bond the plastic sheet B to the warp strands A. It has been found that adhesives manufactured by Armstrong-Cork Co. referred to as G319 and N189 are suitable for such.

After the plastic sheet B has been positioned on the warp strands A such passes through a dryer 17 to cure the adhesive C. The material is then passed beneath a hopper 18 which deposits a uniform layer of scrim yarn D, such as Fiberglas, thereon to give lateral support to the fabric. The randomly aligned fibers D adhered to the plastic sheet minimizes the possibility of the warp strands separating when the finished fabric is being manipulated or used. Another layer of suitable adhesive 19 is sprayed on the scrim D from a reservoir 19a for bonding the scrim yarn to the plastic sheet B.

After the scrim D has been bonded to the first plastic sheet B a second plastic sheet 20 is adhered to the upper surface of the layer of scrim D by adhesive 21 which is sprayed thereon as such passed beneath the reservoir 22. The adhesive-backed plastic sheet 20, which may be of the same material as the first sheet B, is then fed over an idler roller 23 and another roller 24 which positions the plastic sheet on top of the layer of scrim D. The entire fabric is then passed through a dryer 25 provided for curing the adhesive 21 and wound on the takeup beam 12.

A plan view of the finished fabric, with parts broken away, is illustrated in FIG. 2. The top layer is the parallel strands of warp yarn A. The adhesive C is shown between the warp strands A and the plastic sheet B. The following layers of the backing are randomly aligned scrim D, adhesive 19, adhesive binding agent 21, and a plastic sheet 20.

Normally, the manufacture of rugs is a relatively slow process in that when such is being woven or tufted only a few inches are made in an hour. A rug constructed in accordance with the method disclosed in FIG. 1 can be manufactured at a relatively high speed, and is thus inexpensive compared to woven and tufted rugs. One reason such can be manufactured much faster is that the rug incorporates no woven fabrics.

FIGS. 3 and 4 illustrate a modified form of the invention. The apparatus disclosed in FIG. 3 permits the series of parallel warp strands A to be fed off the warp beam 9 and over a conveyor such as described in connection with FIG. 1 and onto the takeup roll 12. As the warp strands A pass under a first plastic feeder 26 a thermoplastic bonding coating 27, such as latex, is deposited uniformly across the warp strand A. One suitable latex is polyethylene. The plastic feeder 26 takes the form of a hopper having an elongated opening adjacent the bottom for feeding the latex onto the warp strands. Any suitable agitator 28 may be used for disturbing the latex material 27 so that a uniform layer of such can be fed from the hopper 26. The warp strands A with the latex 27 thereon are then passed under a heater 29 which cures such. A layer of scrim yarn D is then deposited on the cured plastic binder 27 for adding lateral strength to the fabric. The scrim yarn D may be of any suitable material, such as Fiberglas, and is deposited from a hopper 30 which has an elongated opening adjacent the bottom for distributing the layer of scrim uniformly across the coated warp strands. An agitator 31 is also provided for the hopper 30 so as to insure uniform movement of the scrim therefrom.

After the scrim D has been deposited on the warp strands another layer of binder of thermoplastic material 32 is deposited on top of the scrim for binding such together. Such thermoplastic material 32 is similar or the same as that deposited by the hopper 26 is a latex, such as polyethylene. It is, also, noted that an agitator 33 is provided on the hopper 34 for uniformly distributing the latex on the scrim. The hopper is of the same construction as the hopper 26. Heat lamps 35 are then used to cure the layer of plastic material 32 on the scrim for adhering the fabric together to produce a nonwoven laminated fabric. The finished fabric is then taken up on the takeup roll 12.

A plan view of the finished fabric, with parts broken away, is illustrated in FIG. 4. The top layer is the warp strands A. The spacing between the warp strands in both FIGS. 2 and 4 is exaggerated so as to illustrate the construction of the fabric. The plastic binder 27 is shown directly beneath the warp yarn A, and the scrim D is deposited on the underside of the plastic binder 27. On the other side of the scrim is another layer of plastic binder 32. It is noted that the scrim is in the form of short fibers of random orientation so as to add strength to the backing or fabric. By utilizing a series of parallel warp strands, the upper or wearing surface of the fabric produces a corduroy effect; that is, there are ridges between the parallel strands.

Both the methods disclosed in FIGS. 1 and 3 illustrate a very rapid process for constructing a nonwoven fabric compared to utilizing the conventional process such as weaving or tufting fabric.

While a preferred embodiment of the invention has been described using specific terms, such description is for illustrative purposes only, and it is to be understood that changes and variations may be made without departing from the spirit or scope of the following claims.

What is Claimed is:

1. A nonwoven fabric comprising: a series of parallel warp strands providing an upper wearing surface for said fabric; a plastic sheet covering a lower surface of said parallel warp strands; adhesive means interposed between said parallel warp strands and said plastic sheet for adhering said plastic sheet to said warp strands; a nonwoven layer of randomly aligned scrim yarn carried on the opposite side of said plastic sheet from said warp strands for adding strength to said fabric; and a binding agent adhering said nonwoven layer to said plastic sheet, whereby a reinforced nonwoven fabric of substantial strength is provided.

2. The fabric as set forth in claim 1, wherein another plastic sheet is carried on the opposite side of said nonwoven layer from said first mentioned plastic sheet for aiding in providing a sealed tough backing for said fabric.

where $F_f$=frictional force, and $F_n$=normal force or clamping force.